Figures 1, 2, 3, 4, 5:
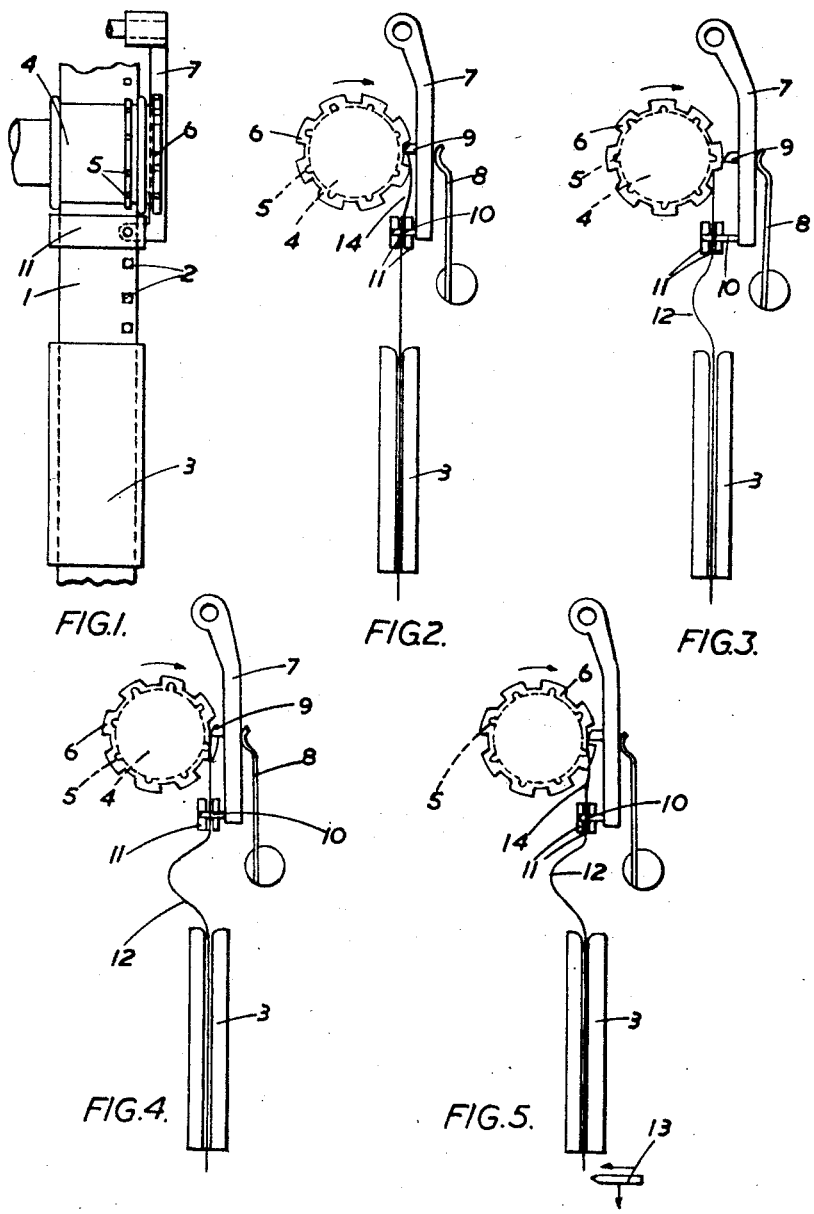

April 16, 1957 H. E. HOLMAN 2,788,703
MECHANISM FOR INTERMITTENTLY DRIVING CINEMATOGRAPH FILMS
Filed Jan. 26, 1953

Inventor
H. E. Holman
Attorney

United States Patent Office 2,788,703
Patented Apr. 16, 1957

2,788,703

MECHANISM FOR INTERMITTENTLY DRIVING CINEMATOGRAPH FILMS

Herbert Edward Holman, West Drayton, England, assignor to Electric & Musical Industries Limited, Hayes, England, a company of Great Britain Application January 26, 1953, Serial No. 333,298

Claims priority, application Great Britain January 30, 1952

2 Claims. (Cl. 88—18)

This invention relates to mechanism for intermittently driving cinematograph films.

It is evident that if the speed of movement of a cinematograph film from frame to frame could be substantially increased considerable advantages would result. For example, if the speed were increased sufficiently the need for the usual obturating shutter would no longer exist and the level of illumination of the screen in the case of a projector would be proportionately increased. In the case of a camera the increased time of exposure of the film which would result would permit either the use of a smaller lens stop or, alternatively, less lighting would be necessary. Furthermore, in the case of film scanners for the televising of cinematograph films if the time required to move the film from frame to frame were reduced to one five-hundredth of a second, the required movement of the film could be effected during the blackout period between successive frame scanning cycles.

Various proposals have been made, for example, in the specification of United States patent application Serial No. 259,754, filed December 4, 1951, now Patent No. 2,716,921, with a view to increasing the speed of movement in an intermittent film driving mechanism. Such devices have been effective so far as increasing the speed of movement of the film is concerned but have been found to suffer owing to lack of stability of the film due to the fact that it is extremely difficult to arrest the motion of the film instantly after a very rapid movement has been imparted to the film. Proposals have been made in conventional types of intermittent film driving mechanism for the purpose of arresting the movement of the film after it has been driven, such devices in some cases comprising cam operated clamping pads whilst in other cases the film gate itself is employed to clamp the film. In these arrangements, however, the final positioning of the film depends on the application of friction which slows up and finally stops the film after it has been driven. Such means of locating the film when applied to an intermittent film driving mechanism where the speed of movement is increased substantially are unsatisfactory since it is impossible to ensure that the coefficient of friction between the film and its braking device is constant. In addition, it is difficult to ensure precise timing since if the clamping device operates before the completion of movement of the film a heavy strain is imposed upon the film, whilst if the clamping device is retarded in its clamping action the momentum of the film will carry it beyond its correct frame position.

The object of the present invention is to provide an improved mechanism for accurately locating the film after its intermittent movement has been effected.

According to the present invention a mechanism for intermittently driving cinematograph films is provided comprising a film gate, means for feeding the film towards the film gate so as to form a loop in the film between said feeding means and said film gate whilst the film is stationary in said gate, arresting means comprising a projection arranged to engage said film at the end of the loop remote from said gate, means for intermittently operating said arresting means so as to cause said projection intermittently to engage a sprocket hole in said film after the formation of said loop, means for pulling the film through said film gate so as to take up the film in said loop and whereby the film is arrested in said film gate due to the engagement of said projection with a sprocket hole in said film and means for disengaging said projection from said film when the film is stationary in said gate so as to allow the formation of a further loop between said gate and said feeding means.

In order that the said invention may be clearly understood and readily carried into effect, it will now be more fully described with reference to the accompanying drawings, in which:

Figure 1 is a front elevation of mechanism according to a preferred embodiment of the invention, and Figures 2, 3, 4 and 5 are side elevations of the mechanism shown in Figure 1 with the parts in various positions.

The mechanism shown in the drawings is particularly suitable for use in conjunction with 16 mm. film having one sprocket hole per frame. The film, indicated at 1 in the drawings having sprocket holes indicated at 2, is arranged to be fed towards a film gate 3 by means of a continuously rotating sprocket wheel 4, which may be provided with eight sprocket teeth indicated at 5 suitable for driving the film aforesaid. Attached to the sprocket wheel 4 so as to be rotated therewith is a notched disc 6 having eight notches around its periphery, as shown in the drawings, said notched disc 6 co-operating with a pivoted lever 7 which is pressed by a spring 8 towards the notched disc 6, said lever 7 having intermediate its length a detent 9 which is adapted to enter the notches in said disc. The leading edge of each notch is suitably profiled as shown in conjunction with the detent 9 so that as the disc 6 is rotated in the direction of the arrow the notches impart angular movement to said lever 7 so that at certain instants the detent 9 on said lever is moved into a notch under the action of said spring 8, whilst at other instants the detent is riding on a circular portion of the disc between adjacent notches. Thus, rotation of the sprocket wheel 4 and the disc 6 result in an oscillating motion of the lever. The end of said lever remote from its pivot is provided with a projection 10 which is adapted to pass through apertures in jaws 11 through which the film passes prior to the film gate 3, said projection 10 also passing through one of the sprocket holes and constituting the arresting means for the film. It will be evident that so long as the detent 9 is riding on a portion of the notched disc between the notches as shown in Figure 3 the projection 10 will be out of engagement with the film as it passes through said jaws 11 so that the film under the action of the driving sprocket can pass freely through said jaws. The arrangement is such that when the detent 9 is moved into a notch in said disc, the projection 10 on said lever will pass through said apertures in the jaws 11 and will also enter one of the sprocket holes in the film as shown in Figures 2, 4 and 5. Rotational movement of the sprocket wheel 4 prior to the entry of said projection 10 into one of the sprocket holes feeds the film towards the gate 3 and produces a loop 12 in the film above the film gate as the light friction imposed by the film gate on the film will prevent the film from being moved through the gate by the rotational movement of the sprocket wheel 4.

Any suitable form of pull-down mechanism is provided for pulling the film through the film gate 3 and in Figure 5 of the drawings the pull-down mechanism is indicated diagrammatically at 13 as comprising a claw which at the appropriate time is moved forwardly to engage a sprocket hole in the film and is then moved downwardly so as to pull the film through the film gate. Figure 5 of the drawings illustrates the parts in a position for the operation of the pull-down mechanism, the pull-down mechanism operating so as to move the film through one frame during which movement the loop 12 which was previously formed in the film between the projection 10 and the gate 3 is taken up as shown in Figure 2. The pull-down mechanism is arranged so that the power which is available for the rapid pull-down operation is expended in imparting movement to the film so that during the latter part of the downward movement of the film it is the momentum of the film which causes movement of the latter and the film is then arrested in its movement owing to the engagement of the projection 10 with a sprocket hole.

Whilst the projection 10 is in engagement with the film the sprocket wheel 4 continues to rotate so that a small loop 14 is formed in the film between the sprocket wheel 4 and the projection 10 but when, however, the projection 10 is withdrawn from the sprocket hole by the action of the notched disc 6, said small loop is removed since the jaws 11 impose little friction on the film and continued rotation of the sprocket wheel 4 then produces the loop 12 in the film between the projection 10 and the film gate 3 as shown in Figure 3, where the loop 12 is commencing to be formed. This loop 12 continues in its formation until the parts are in the position shown in Figure 4, when the projection 10 enters a sprocket hole in the film and the loop 14 then commences to form as shown in Figure 5. Due to the formation of the loop 14 after the projection 10 has been caused to enter a sprocket hole, the upper end of the sprocket hole will be urged into contact with the projection 10 so that when the film is arrested by the projection 10, there will be little possibility of rebound of the film occurring, such as might arise if the upper end of the sprocket hole were not in engagement with the projection.

It will be appreciated that the teeth on the sprocket wheel 4 during the feeding movement of the film engage the lower ends of the sprocket holes and likewise the intermittently operating pull-down mechanism also engages the lower ends of said sprocket holes but it is the upper end of the sprocket hole which is engaged by the projection 10 when the film is arrested. It will also be appreciated that the arresting means functions to arrest the film without the employment of friction, such as occurs when friction pads are employed or such as would occur if the film were arrested by pulling the film against a stationary sprocket wheel. In this latter case it will be appreciated that after a film has been fed forwardly, one of the sprocket teeth is in engagement with the forward end of one of the sprocket holes in the film and that then when the film is arrested the film must be moved relatively to the sprocket wheel until the rear end of one of the sprocket holes engages one of the sprocket teeth. This relative movement between the film and the sprocket wheel introduces a degree of friction which will be variable and furthermore, the position in which the film will be arrested will depend on the age and degree of shrinkage of the film, since sprocket teeth are always dimensioned so as to permit a sufficient clearance in the sprocket holes to take into account shrinkage of the film.

The actual mechanism employed for imparting the intermittent movement to the film can be of any suitable type such as the rapid intermittent driving mechanism referred to in the specification of the aforesaid co-pending patent application or of any other suitable type such as the compressed air type which has also been proposed.

Other kinds of film feeding and locating mechanisms may be employed as, for example, the conventional cam operated claw mechanism, can be used both for feeding and location of the film in which case the sprocket wheel 4 above referred to can be dispensed with. When a claw mechanism is employed for feeding the film in place of the sprocket wheel 4, such claw mechanism will be employed to feed the film intermittently through the jaws 11 so as to form the loop 12.

It will be appreciated that the invention can also be applied to films having two rows of sprocket holes, in which case a pair of projections 10 will preferably be employed for engagement with opposite sprocket holes.

The invention can be applied to cinematograph cameras and cinematograph projectors but is particularly suitable for use in apparatus for scanning films for the generation of signals for television transmission.

What I claim is:

1. Mechanism for intermittently driving cinematograph film comprising a film gate, a projection spaced from said gate, a continuously driven sprocket wheel immediately preceding said projection for feeding the film towards said film gate, a lever on which said projection is mounted, a notched disc co-operating with said lever to impart motion to said projection, means driving said sprocket wheel and notched disc in synchronism, means holding the film stationary in said gate during film feeding thereby to cause the formation of a loop in said film between said projection and said gate, said notched disc and sprocket wheel being timed to cause said projection to move into a sprocket hole in said film after the formation of said loop, means for intermittently advancing said film through said gate for a predetermined limited amount to enable thereafter the momentum of said film to complete the final advance of said film until arrested by said projection, said notched disc and sprocket wheel being further timed to move said projection thereafter out of said sprocket hole.

2. Mechanism for intermittently driving cinematograph film comprising a film gate, a projection spaced from said gate, a lever on which said projection is mounted, a pair of jaws spaced to receive said film, said jaws having formed therein apertures to receive said projection, a continuously driven sprocket wheel immediately preceding said projection for feeding the film towards said film gate, a notched disc co-operating with said lever to impart motion to said projection, means driving said sprocket wheel and notched disc in synchronism, means holding the film stationary in said gate during film feeding thereby to cause formation of a loop in said film between said projection and said gate, said notched disc and sprocket wheel being timed to cause said projection to move into said apertures in said jaws and into a sprocket hole in said film between said jaws after the formation of said loop, means for intermittently advancing said film through said gate for a predetermined limited amount to enable thereafter the momentum of said film to complete the final advance of said film until arrested by said projections said notched disc and sprocket wheel being further timed to move said projection thereafter out of said sprocket hole.

References Cited in the file of this patent

UNITED STATES PATENTS

| | | |
|---|---|---|
| 1,023,797 | Batdorf | Apr. 23, 1912 |
| 2,560,918 | Bedford et al. | July 17, 1951 |
| 2,560,919 | Bedford | July 17, 1951 |